(12) United States Patent
Yoshizawa et al.

(10) Patent No.: US 8,612,221 B2
(45) Date of Patent: Dec. 17, 2013

(54) PORTABLE TERMINAL AND MANAGEMENT SYSTEM

(75) Inventors: Junichi Yoshizawa, Matsumoto (JP); Tetsuo Ozawa, Tastuno-machi (JP); Koji Koseki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 449 days.

(21) Appl. No.: 12/698,990

(22) Filed: Feb. 2, 2010

(65) Prior Publication Data

US 2010/0198591 A1 Aug. 5, 2010

(30) Foreign Application Priority Data

Feb. 4, 2009 (JP) ................................. 2009-024188

(51) Int. Cl.
*G10L 15/00* (2013.01)

(52) U.S. Cl.
USPC ........ 704/231; 717/101; 705/301; 704/270.1; 704/270; 704/252; 704/251; 704/233; 702/150; 701/420; 700/83; 455/550.1; 455/403; 379/88.03; 379/88.02; 370/328; 342/357.34

(58) Field of Classification Search
USPC ................ 701/420; 455/550.1, 403; 704/233, 704/270.1, 252, 570, 251; 717/101; 705/301; 702/150; 700/83; 379/88.03, 379/88.02; 370/328; 342/357.34
See application file for complete search history.

(56) References Cited

U.S. PATENT DOCUMENTS

| | | | | |
|---|---|---|---|---|
| 4,809,333 A | * | 2/1989 | Taylor | 704/252 |
| 5,781,150 A | * | 7/1998 | Norris | 342/357.34 |
| 5,828,987 A | * | 10/1998 | Tano et al. | 702/150 |
| 5,905,773 A | * | 5/1999 | Wong | 379/88.03 |
| 5,970,446 A | * | 10/1999 | Goldberg et al. | 704/233 |
| 6,083,353 A | * | 7/2000 | Alexander, Jr. | 202/158 |
| 6,202,024 B1 | * | 3/2001 | Yokoyama et al. | 701/420 |
| 6,640,145 B2 | * | 10/2003 | Hoffberg et al. | 700/83 |
| 7,191,135 B2 | * | 3/2007 | O'Hagan | 704/270.1 |
| 7,272,377 B2 | * | 9/2007 | Cox et al. | 455/403 |
| 7,328,155 B2 | * | 2/2008 | Endo et al. | 704/251 |
| 7,593,605 B2 | * | 9/2009 | King et al. | 382/313 |
| 7,609,669 B2 | * | 10/2009 | Sweeney et al. | 370/328 |
| 7,639,876 B2 | * | 12/2009 | Clary et al. | 382/186 |
| 7,769,364 B2 | * | 8/2010 | Logan et al. | 455/413 |

(Continued)

FOREIGN PATENT DOCUMENTS

| | | |
|---|---|---|
| JP | 07-325870 A | 12/1995 |
| JP | 08-320697 A | 12/1996 |

(Continued)

*Primary Examiner* — Michael Colucci
(74) *Attorney, Agent, or Firm* — Kilpatrick Townsend & Stockton LLP (57) ABSTRACT

A portable terminal having an audio pickup means that acquires sound, an absolute position detection unit that detects the absolute position of the portable terminal, a relative position detection unit that detects the relative position of the portable terminal, and a speech recognition and synthesis unit that recognizes the audio acquired by the audio pickup means as speech, is achieved with a simple configuration. A portable terminal (1) that exchanges data with a server (2) has disposed to the portable terminal an audio pickup means that acquires sound, an absolute position detection unit (1-1) that detects the absolute position of the portable terminal, a relative position detection unit (1-2) that detects the relative position of the portable terminal, and a speech recognition and synthesis unit (1-3) that recognizes the audio acquired by the audio pickup means as speech.

10 Claims, 5 Drawing Sheets

(56) References Cited

U.S. PATENT DOCUMENTS

| | | | |
|---|---|---|---|
| 7,852,993 B2* | 12/2010 | Ju et al. | 379/88.02 |
| 2005/0010892 A1* | 1/2005 | McNair et al. | 717/101 |
| 2005/0153729 A1* | 7/2005 | Logan et al. | 455/550.1 |
| 2007/0032225 A1* | 2/2007 | Konicek et al. | 455/417 |
| 2007/0198269 A1* | 8/2007 | Braho et al. | 704/270 |
| 2008/0091443 A1* | 4/2008 | Strope et al. | 705/1 |
| 2008/0261564 A1* | 10/2008 | Logan | 455/413 |

FOREIGN PATENT DOCUMENTS

| | | |
|---|---|---|
| JP | 2001-503134 A | 3/2001 |
| JP | 2003-219474 A | 7/2003 |
| JP | 2006-317573 A | 11/2006 |
| JP | 2008-226085 A | 9/2008 |
| JP | 2008-293168 A | 12/2008 |

* cited by examiner

PORTABLE TERMINAL AND MANAGEMENT SYSTEM

This application claims priority to Japanese Patent Application No. 2009-024188, filed Feb. 4, 2009, the entirety of which is incorporated by reference herein.

BACKGROUND

1. Technical Field

The present invention relates to a portable terminal and to a management system for managing the portable terminal, and relates more particularly to a portable terminal that is carried by a worker working in a predefined area, and to a management system suitable for managing workers through the portable terminal.

2. Related Art

A typical workplace where plural workers work generally has a workplace manager that is responsible for managing the workers and knowing what each of the workers is doing. Systems in which the workers enter the tasks they are currently doing have also been developed to lighten the load of the manager. See, for example, Japanese Unexamined Patent Appl. Pub. JP-A-H07-325870.

With the system taught in JP-A-H07-325870, tasks to be performed by a worker are displayed on a display screen, and each time the worker completes a displayed task and proceeds to the next task, the worker uses a pointing device to input information indicating a change in the task being performed.

In order for the workers to input information to the system taught in JP-A-H07-325870, each worker must be taught how to operate the system, and the wrong information may be input as a result of operating errors. Significant effort is therefore required to train the workers in system operation and to correct operating errors.

To solve this problem, Japanese Unexamined Patent Appl. Pub. JP-A-2008-293168 teaches a task management system that enables reliably recording the work status of plural workers without forcing the workers to perform a complicated operation as described below.

The task management system taught in JP-A-2008-293168 has a pickup device for capturing the speech of workers in the work area, a speech recognition device for recognizing and converting the speech acquired by the pickup device to text data, and a storage control device that correlates information acquired from the text data produced by the speech recognition device with information indicating the time the speech corresponding to the text data was captured by the pickup device, and storing the acquired information and time for each worker in a history storage device.

This system can accurately record the speech of workers in the work area because information acquired from the speech of the workers in the work area is stored correlated to the time the speech was acquired. As a result, when a worker reports by voice, text data can be generated from the speech and information related to the work status can be recorded. Work status information can also be passively recorded without the workers actively reporting their work status by capturing the speech directed by workers to customers or other workers and acquiring data relating to this speech. Work status information can thus be reliably recorded without requiring workers to perform a special operation or task for recording the work status.

The terminal device and task management device described below are taught in JP-A-2008-293168 as components of the task management system.

Figure 4:
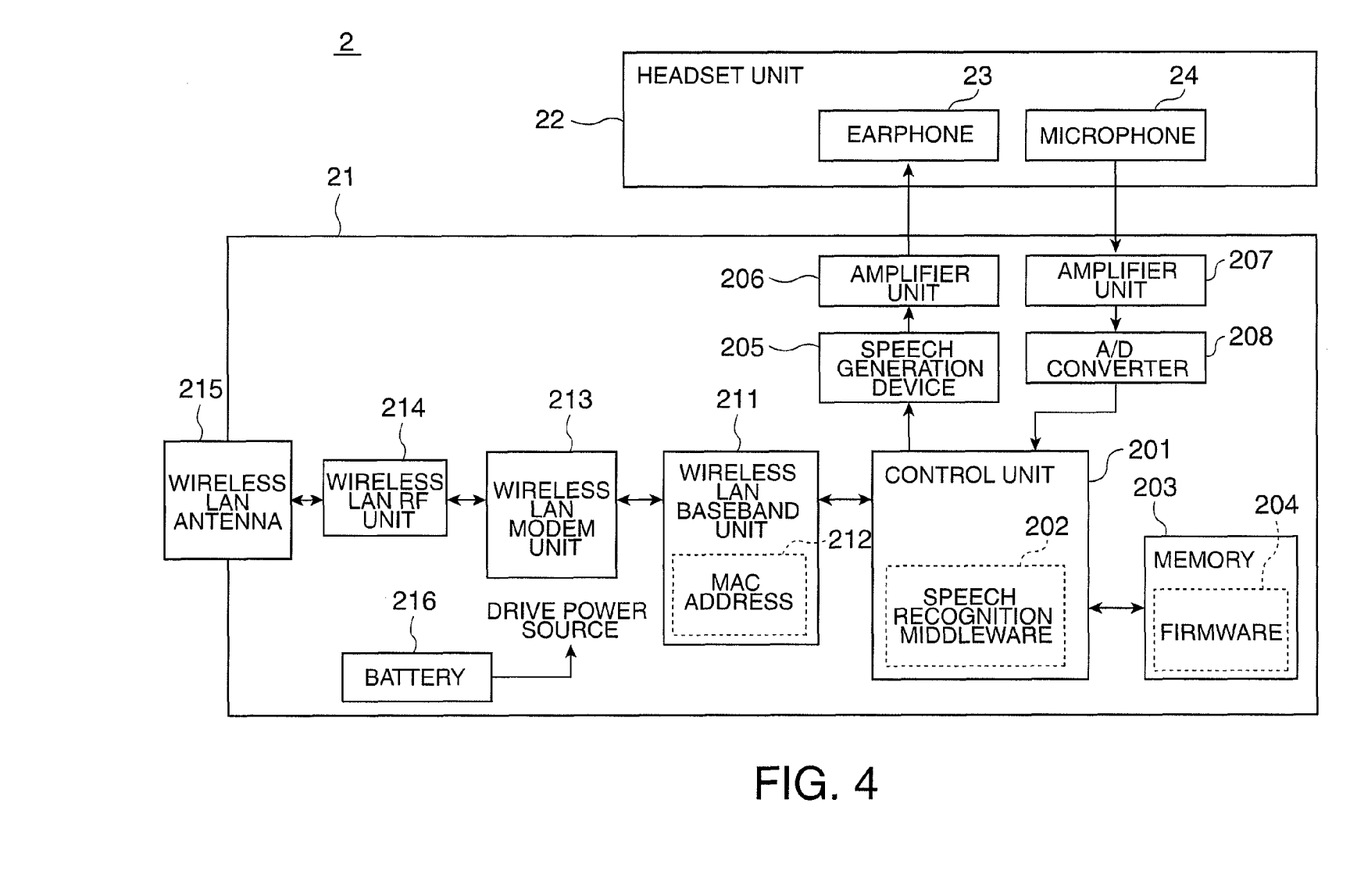
FIG. 4 is a block diagram showing the functional configuration of a terminal device according to the related art.

FIG. 4 is a block diagram showing the functional configuration of a terminal device 2 according to the related art taught in JP-A-2008-293168.

As shown in FIG. 4, the terminal device 2 has a control unit 201 that controls various parts of the terminal device 2, and memory 203 that dynamically or statically stores data and programs processed by the control unit 201.

The control unit 201 internally stores speech recognition middleware 202, and has a function for converting employee speech captured by a microphone 24 to text data by executing the speech recognition middleware 202. The control unit 201 also controls other parts of the terminal device 2 by reading and executing firmware 204 stored in memory 203.

The terminal device 2 has a speech generation device 205 that generates a speech signal from information input as text data as controlled by the control unit 201, and an amplifier unit 206 that amplifies the speech signal generated by the speech generation device 205. The speech signal amplified by the amplifier unit 206 is input to the earphone 23 of the main unit 21, and the audio is output from the earphone 23 to the ear of the worker.

The terminal device 2 also has an amplifier unit 207 that amplifies the speech signal output from the microphone 24, and an A/D converter 208 that converts the analog audio signal amplified by the amplifier unit 207 to a digital audio data. The converted digital audio data is output from the A/D converter 208 to the control unit 201, and the control unit 201 converts the input digital audio data to text data using a function of the speech recognition middleware 202.

The speech generation device 205 has a function for converting input text data to a speech signal in the same language. More specifically, when Japanese text data is input, the speech generation device 205 executes a speech synthesis process that generates a Japanese speech signal based on the text data by referring to an internally stored speech synthesis dictionary. If the speech generation device 205 is configured with speech synthesis dictionaries for other languages, such as Chinese, English, or French, the speech generation device 205 can also generate speech signals in the same language as the language of the input text data. This configuration can output speech in languages other than Japanese as a result of the task management device 3 sending text data in Chinese or English, for example, to the terminal device 2, and the terminal device 2 receiving the text data and generating a speech signal based on the received text data. If there is an employee whose first language is not Japanese, for example, speech in the employee's language can be output from the earphone 23 to issue instructions or communicate with the employee.

Based on the audio signal output from the microphone 24, the control unit 201 that executes the speech recognition middleware 202 recognizes the speech by applying phoneme analysis, for example, in a predetermined language (such as Japanese in this example), and generates and outputs text data in that language (Japanese in this example).

If the speech recognition middleware 202 is rendered compatible with other languages by providing data for phoneme analysis of languages other than Japanese, the control unit 201 that executes the speech recognition middleware 202 can also recognize speech signals in other languages, such as Chinese or English, and can also generate and output text data in the same language.

The terminal device 2 has a wireless LAN baseband unit 211, a wireless LAN modem unit 213, and a wireless LAN RF unit 214 as functional units for creating a wireless LAN to which a task management device 3 is also connected.

The wireless LAN baseband unit 211 generates packets containing information input from the control unit 201. The wireless LAN modem unit 213 modulates the packets generated by the wireless LAN baseband unit 211 and outputs the modulated packets to the wireless LAN RF unit 214. The wireless LAN RF unit 214 transmits the modulated signal generated by the wireless LAN modem unit 213 through a wireless LAN antenna 215 as a RF signal.

The wireless LAN baseband unit 211 includes MAC address memory 212 that stores a MAC (Media Access Control) address unique to the terminal device 2, and the MAC address stored in the MAC address memory 212 is contained in the packets generated by the wireless LAN baseband unit 211. This MAC address is used to identify plural terminal devices 2 when controlling communication over the wireless LAN.

The wireless LAN RF unit 214 also extracts and outputs the modulated signal from the wireless signal received through the wireless LAN antenna 215 to the wireless LAN modem unit 213. The wireless LAN modem unit 213 demodulates the modulated signal and extracts the packets, and the wireless LAN baseband unit 211 outputs the information contained in the packets generated by the wireless LAN modem unit 213 to the control unit 201.

Note that the parts shown in FIG. 4 operate using drive power supplied from a battery 216 in the main unit 21.

The terminal device 2 configured as shown in FIG. 4 executes the functions described below through the interaction of hardware and software components.

Wireless communication function: The terminal device 2 renders a wireless communication function that renders a wireless LAN, to which the task management device 3 is also connected, for sending and receiving text data and information for identifying an individual terminal device 2 of a particular MAC address as a result of the control unit 201 controlling the wireless LAN baseband unit 211, the MAC address memory 212, the wireless LAN modem unit 213, the wireless LAN RF unit 214, and the wireless LAN antenna 215.

Speech output function: The terminal device 2 renders a speech output function that outputs speech from the earphone 23 as a result of the control unit 201 controlling the speech generation device 205 and the amplifier unit 206 and outputting a speech signal from the amplifier unit 206 to the earphone 23.

Speech recognition function: The terminal device 2 renders a speech recognition function that converts employee speech picked up by the microphone 24 to text data and outputs the text data as a result of the control unit 201 controlling the amplifier unit 207 and A/D converter 208 and the control unit 201 also executing the speech recognition middleware 202.

Figure 5:
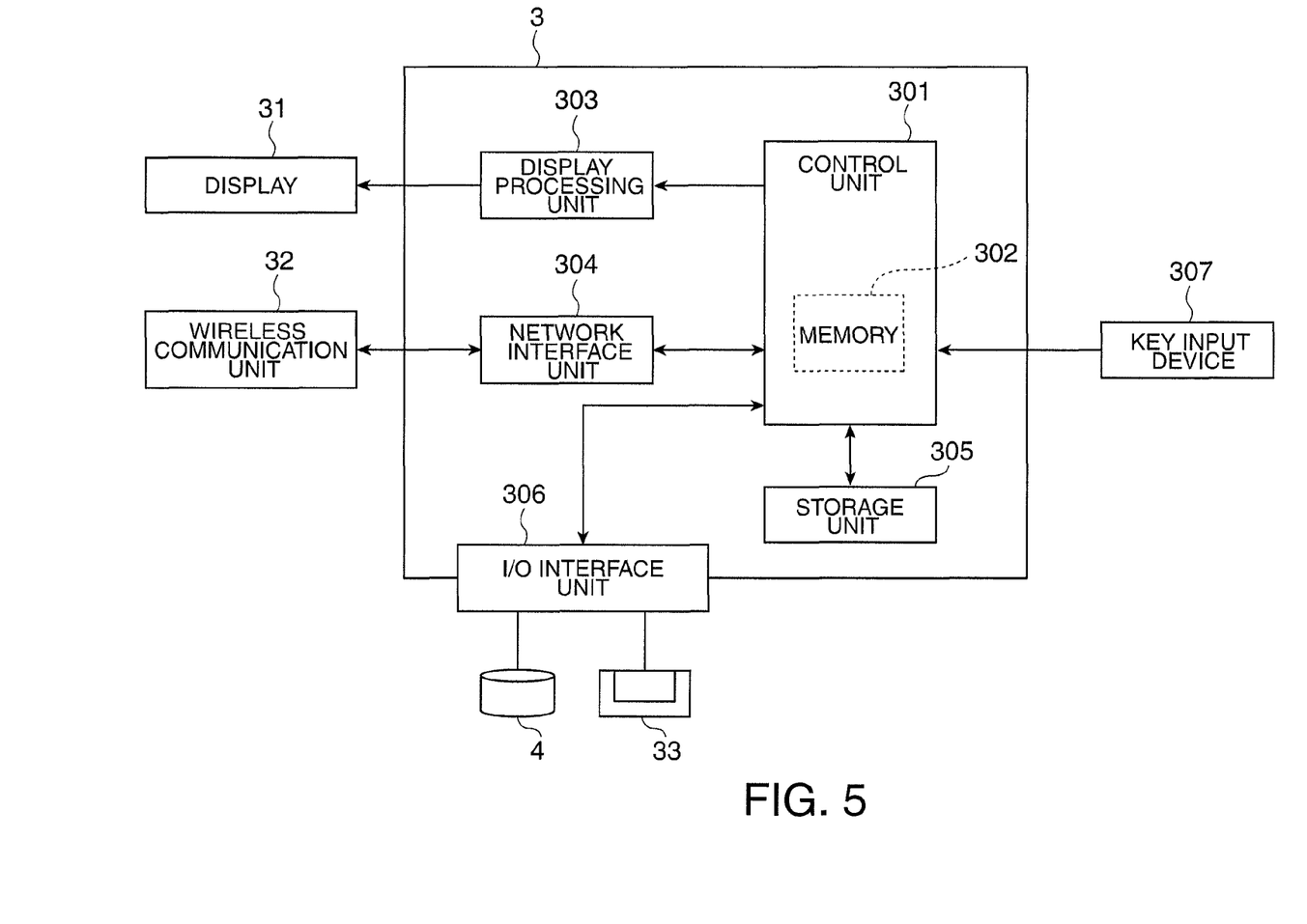
FIG. 5 is a block diagram showing the functional configuration of a task management device according to the related art.

FIG. 5 is a block diagram showing the functional configuration of the task management device 3.

As shown in FIG. 5, the task management device 3 has a control unit 301 that controls various parts of the task management device 3, and memory 302 that dynamically or statically stores data and programs processed by the control unit 301. Connected to the control unit 301 are a display processing unit 303 that presents different display screens on the display 31, a network interface unit 304 for sending and receiving data through a wireless communication unit 32, a storage unit 305 that stores the program executed by the control unit 301, an I/O interface unit 306 for connecting external devices to the task management device 3, and a key input device 307 that is external to the task management device 3.

As controlled by the control unit 301, the display processing unit 303 generates and outputs to the display 31 video signals for displaying various screens on the display 31.

The display 31 has a display screen such as a CRT (cathode ray tube) or LCD (liquid crystal display) device, and displays images and text based on the video signal input from the display processing unit 303.

The storage unit 305 is a storage device that uses a semiconductor storage device or a recording medium enabling reading and writing data magnetically or optically, and statically stores programs that are run by the control unit 301 and data relating to said programs, for example.

The network interface unit 304 is connected to the wireless communication unit 32, and exchanges data with the terminal device 2 through the wireless communication unit 32 as controlled by the control unit 301.

The wireless communication unit 32 is a device that renders a wireless LAN in conjunction with the terminal device 2 in a work area such as an amusement park 100, and has a built-in antenna, RF unit, modem unit, and baseband unit, for example, for communicating using the protocol of the wireless LAN.

The I/O interface unit 306 is an interface for connecting external devices to the task management device 3, and in this example has a printer 33 and a storage device 4 connected thereto. By controlling the storage device 4 through the I/O interface unit 306, the control unit 301 can process data in a database stored in the storage device 4, including such operations as storing, searching, retrieving, and updating data.

The control unit 301 also controls the printer 33 through the I/O interface unit 306, and causes the printer 33 to print and output various forms.

The key input device 307 is a device having text and numeric keys, or function keys to which specific functions are assigned, and generates and outputs to the control unit 301 operation signals corresponding to the keys operated by the operator.

The task management device 3 configured as shown in FIG. 5 executes the functions described below through the interaction of hardware and software components.

Wireless communication function: The task management device 3 renders a wireless communication function in conjunction with the wireless communication unit 32 for exchanging text data and information uniquely identifying a particular terminal device 2 with the terminal device 2 as a result of the control unit 301 controlling the network interface unit 304.

Schedule management function: The task management device 3 stores schedule data input from the key input device 307 in the storage unit 305 through a function of the control unit 301. This schedule data is input by date and employee, and is stored in the storage unit 305. When outputting the schedule is indicated by operating the key input device 307, for example, the control unit 301 controls the display processing unit 303 to display the schedule on the display 31, and controls the printer 33 through the I/O interface unit 306 to print and output a hard copy of the schedule of the specified employee on the specified date.

Database management function: The task management device 3 accesses a database in the storage device 4 through the I/O interface unit 306 by means of the control unit 301 to, for example, store, search, extract, update, or delete data in a database stored in the storage device 4.

History storage control function: Based on text data received from the terminal device 2 through the wireless communication unit 32 and data for identifying the terminal device 2, the task management device 3 acquires information related to the work history of the employee wearing the terminal device 2, and based on this information updates the data in the storage device 4, by means of the control unit 301.

History output function: The task management device 3 references data in the storage device 4 through the I/O interface unit 306, and causes the printer 33 to print and output data from the database stored in the storage device 4 in a particular format, by means of the control unit 301.

As a means for detecting the position of the terminal device (that is, the location of the worker that has the terminal device) in the terminal device described in JP-A-2008-293168, paragraph (0057) in JP-A-H07-325870 says "In addition to these devices, wireless communication tags for position detection may be disposed to hallways and walls, for example, in the amusement park 100, and these wireless communication tags can be detected by the terminal device 2 and the position determined. In this situation, the terminal device 2 wirelessly sends position information together with the text data to the task management device 3, and the task management device 3 may store the wirelessly transmitted text data and position information in the work history database 41 without needing to identify the position of the employee. In this configuration an RFID (radio frequency identification) tag that uses a frequency in the 900 MHz band or 2.45 GHz band, for example, may be used as the wireless communication tags" (in Japanese).

The position data that can be detected by this method in which "wireless communication tags (such as RFID tags) for position detection may be disposed to hallways and walls, for example, and these wireless communication tags can be detected by the terminal device 2 and the position determined" is limited to the absolute position data for the location of the terminal device.

However, as the uses for such terminal devices have expanded, acquiring relative position data (how fast or how many steps the terminal device moved in what direction for a specific time (at a specific time)) for the terminal device and not just the absolute position data for the location of the terminal device has become desirable, but a terminal device enabling easily acquiring relative position data for the terminal device has not been achieved.

SUMMARY

An object of the present invention is to provide a portable terminal that has an audio pickup means that acquires sound, an absolute position detection unit that detects the absolute position of the portable terminal, a relative position detection unit that detects the relative position of the portable terminal, and a speech recognition and synthesis unit that recognizes the audio acquired by the audio pickup means as speech, and with a simple configuration can shorten the speech processing time and improve recognition (speech input discrimination) accuracy.

Another object of the invention is to provide a system that, by sending the relative position of the portable terminal with the absolute position data of the portable terminal to a management server, can be deployed in a wide range of fields in which the management system of the related art cannot be used.

A portable terminal according to the present invention has an audio pickup means that acquires sound; an absolute position detection unit that detects the absolute position of the portable terminal; a relative position detection unit that detects the relative position of the portable terminal; and a speech recognition and synthesis unit that recognizes the audio acquired by the audio pickup means as speech.

Preferably, the detection result of the absolute position detection unit is complemented using the detection result from the relative position detection unit.

Further preferably, the speech recognition and synthesis unit includes an audio to digital data conversion means that recognizes the acquired sound as digital data by comparing the acquired sound with predetermined speech data. The portable terminal can also communicate with a server, and outputs the absolute position data detected by the absolute position detection unit and the relative position data detected by the relative position detection unit with the recognized digital data to the server.

Further preferably, the predetermined speech data can be changed based on the absolute position detected by the absolute position detection unit.

Yet further preferably, a digital data to speech conversion means that converts digital data received from the server to speech is disposed to the portable terminal.

Yet further preferably, the portable terminal can receive signals transmitted from a short-range communication device, and the absolute position detection unit calculates the absolute position based on said signals.

Yet further preferably, the relative position detection unit is at least one sensor selected from a group including a 3-axis gyroscopic sensor, a 3-axis acceleration sensor, a barometric pressure sensor, and a geomagnetic sensor.

Another aspect of the invention is a management system including at least one portable terminal described above, and a server that manages the portable terminal.

The invention thus described provides a portable terminal that has an audio pickup means that acquires sound, an absolute position detection unit that detects the absolute position of the portable terminal, a relative position detection unit that detects the relative position of the portable terminal, and a speech recognition and synthesis unit that recognizes the audio acquired by the audio pickup means as speech, and with a simple configuration can shorten the speech processing time and improve recognition (speech input discrimination) accuracy.

The invention thus described also provides a system that, by sending the relative position of the portable terminal with the absolute position data of the portable terminal to a server, can be deployed in a wide range of fields in which the management system of the related art cannot be used.

Other objects and attainments together with a fuller understanding of the invention will become apparent and appreciated by referring to the following description and claims taken in conjunction with the accompanying drawings.

DESCRIPTION OF EMBODIMENTS

The hardware configuration of a portable terminal and management system therefor according to a preferred embodiment of the present invention are described below with reference to FIG. 1 and FIG. 2.

The portable terminal and management system therefor according to this embodiment of the invention are described below with reference to a system in which a portable terminal is held by at least one employee that performs various tasks in a restaurant and a management server manages the portable terminal (employee).

Figure 1:
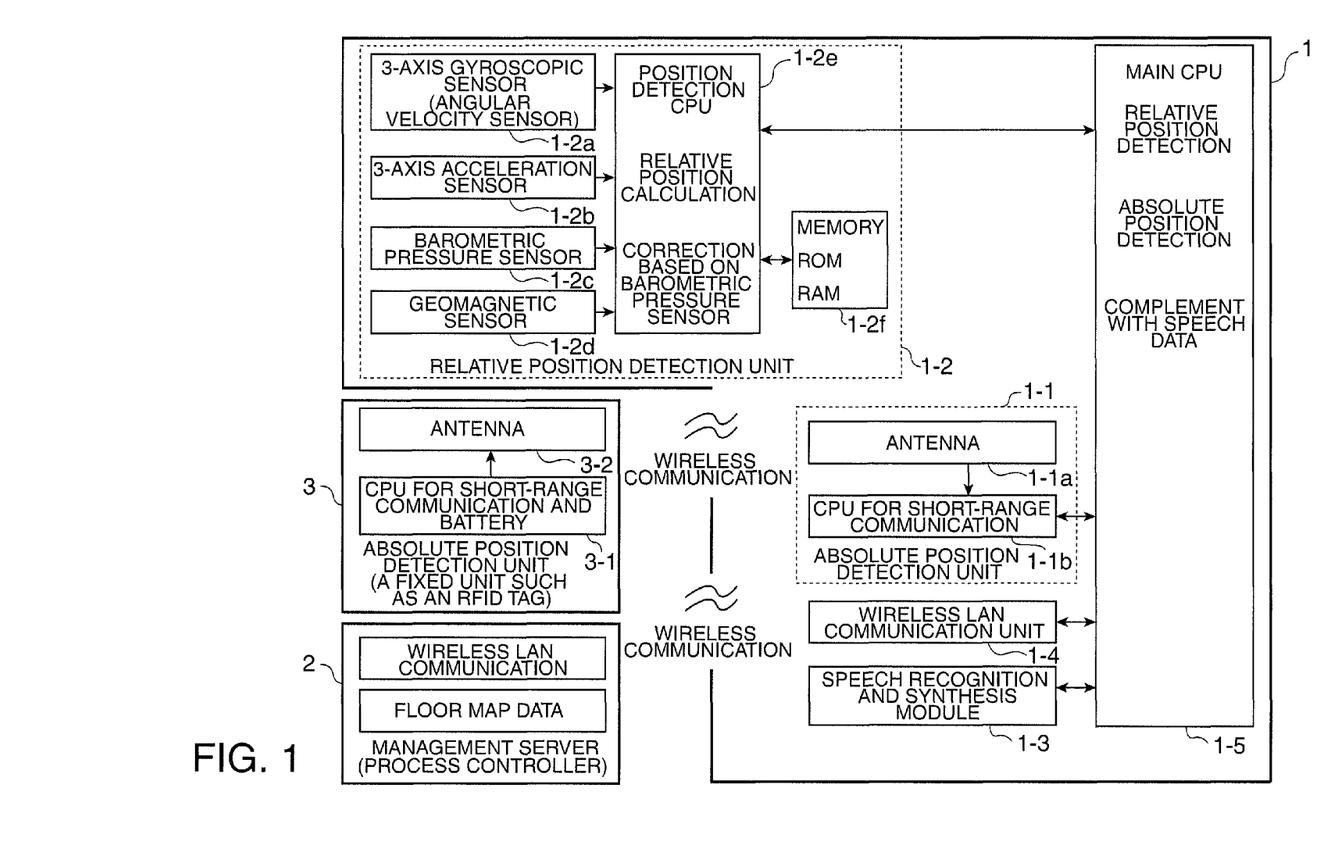
FIG. 1 is a block diagram showing the functional configuration of a terminal device according to the present invention.

Referring to FIG. 1, a portable terminal 1 is carried by at least one employee, and the portable terminal 1 is used paired with a headset that is worn on the employee's head and includes a microphone and a speaker.

Communication between the portable terminal and the headset may be by wire or wireless.

Included in the portable terminal are an absolute position detection unit 1-1, a relative position detection unit 1-2, a speech recognition and synthesis module 1-3, a communication unit 1-4 for communicating with the management server described below (wireless LAN communication in FIG. 1), a control unit 1-5 (main CPU) that controls these other parts, and a power supply (battery) not shown.

A management server 2 (process controller) is connected through a communication unit (wireless LAN communication in FIG. 1) to a portable terminal held by the at least one employee. The management server 2 executes overall management, such as managing the employee that has the portable terminal or issuing work instructions through the portable terminal.

The management server also has a storage unit in which a database appropriate to the field in which the management system is used is previously stored. Because a restaurant is managed in the embodiment shown in FIG. 1, the database stores a floor map of the restaurant, for example.

An absolute position detection unit 3 (a fixed unit such as an RFID tag) that is paired with the absolute position detection unit 1-1 of the portable terminal in FIG. 1 is disposed to each of a plurality of tables located on a floor of the restaurant.

Included in the absolute position detection unit (RFID tag or other fixed unit) 3 are a communication unit 3-1 including a CPU for short-range communication, an antenna 3-2, and a battery as a power supply. Note that because the absolute position detection unit is a stationary unit, the power supply is not limited to a battery, and a commercial power supply may be used instead.

The configuration of a portable terminal according to the invention is described in detail next.

Short-range communication signals are transmitted through the antenna 3-2 from the RFID tag of an absolute position detection unit (RFID tag or other fixed unit) 3 located at each of a plurality of tables.

The absolute position detection unit 1-1 receives the short-range communication signals through the antenna 1-1a of the absolute position detection unit 1-1, and calculates the absolute position of the portable terminal by means of the CPU for short-range communication 1-1b.

In addition to short-range communication using RFID devices, Bluetooth (10 m to 100 m), ZigBee (10 m to 70 m), Wibree (10 m), and UWB (10 m), for example, can be used for short-range communication in the invention.

Because the positions of the one or more antennas 3-2 located on the floor are predetermined, the short-range communication CPU of the absolute position detection unit can calculate the absolute position of the portable terminal from the phase difference of the signals received from plural antennas.

A 3-axis gyroscopic sensor 1-2a, 3-axis acceleration sensor 1-2b, barometric pressure sensor 1-2c, and geomagnetic sensor 1-2d are disposed as relative position detection sensors in the relative position detection unit 1-2 shown in FIG. 1.

While four types of relative position detection sensors are disposed in the portable terminal shown in FIG. 1, four types of relative position detection sensors may not be necessary depending upon the field in which the portable terminal and management system are used, and any combination containing more than one of these four types of sensors can be used, or a relative position detection sensor of a different type than these four types, can be used.

Based on the detection output of these relative position detection sensors 1-2a to 1-2d and the application of the portable terminal and management system, the position detection CPU 1-2e calculates relative position data indicating at what speed or how many steps the portable terminal moved in which direction at a specific time.

To calculate this relative position data, a program that is previously stored in memory 1-2f (ROM, RAM) for calculating the relative position is used, and the calculated result is stored in memory as needed.

The position detection CPU 1-2e sends the relative position data to the main CPU 1-5.

The wireless LAN communication unit 1-4 is paired with the management server 2 (process controller), and sends and receives data communicated with the worker through the headset including a microphone and speaker that is worn on the head of the worker holding the portable terminal.

The speech recognition and synthesis module 1-3 of the invention recognizes primarily the speech voiced by the worker from the microphone of the headset that is worn on the head of the worker holding the portable terminal.

The speech recognition and synthesis unit including the speech recognition and synthesis module is described next in detail with reference to FIG. 2.

Figure 2:
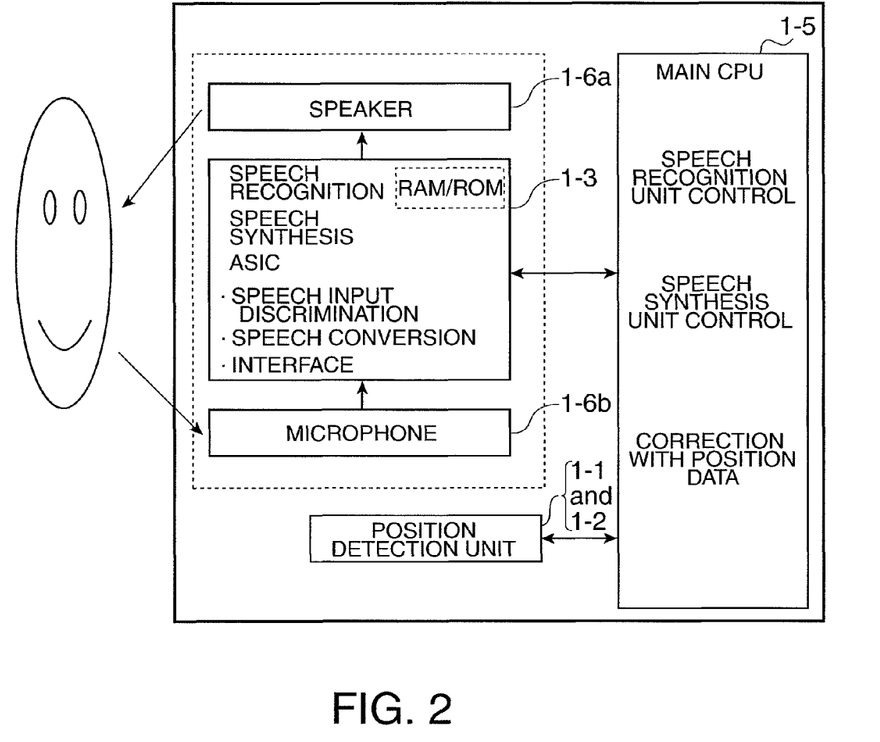
FIG. 2 is a block diagram showing in detail the functional configuration of the speech recognition and synthesis unit of a terminal device according to the present invention.

FIG. 2 shows the speech recognition and synthesis unit, and shows the functional configuration of the part related to speech recognition and speech synthesis in the speech recognition and synthesis module, the position detection unit (absolute position detection unit 1-1 and relative position detection unit 1-2), and the control unit (main CPU) 1-5.

In FIG. 2 reference numeral 1-3 denotes the speech recognition and synthesis module of the portable terminal held by at least one worker, and the speech recognition and synthesis module 1-3 is communicably connected by wire or wirelessly to the microphone 1-6b and speaker 1-6a of the headset worn on the head of the worker.

The speech recognition and synthesis module is rendered by a dedicated speech recognition and speech synthesis chip, acquires speech voiced by the worker through the microphone of the headset, recognizes (speech input discrimination) and converts the speech to digital data (text data or code data), and outputs to the control unit (main CPU) 1-5. The speech recognition and synthesis module also converts digital data (text data or code data) for instructions to the worker sent from the control unit (main CPU) 1-5 to speech data (speech conversion), and outputs the result from the speaker of the headset.

Speech input discrimination and speech conversion generally require a large database and processing time in order to convert (discriminate) speech without limiting the languages used. However, the invention shortens the processing time and improves recognition (speech input discrimination) accuracy by referencing the detection data from the position detection unit and using a database that is limited to the terminology that might be used in the position (location) where the portable terminal is located.

More specifically, when the location of the portable terminal is different, the database that is used for conversion can be changed.

Figure 3:
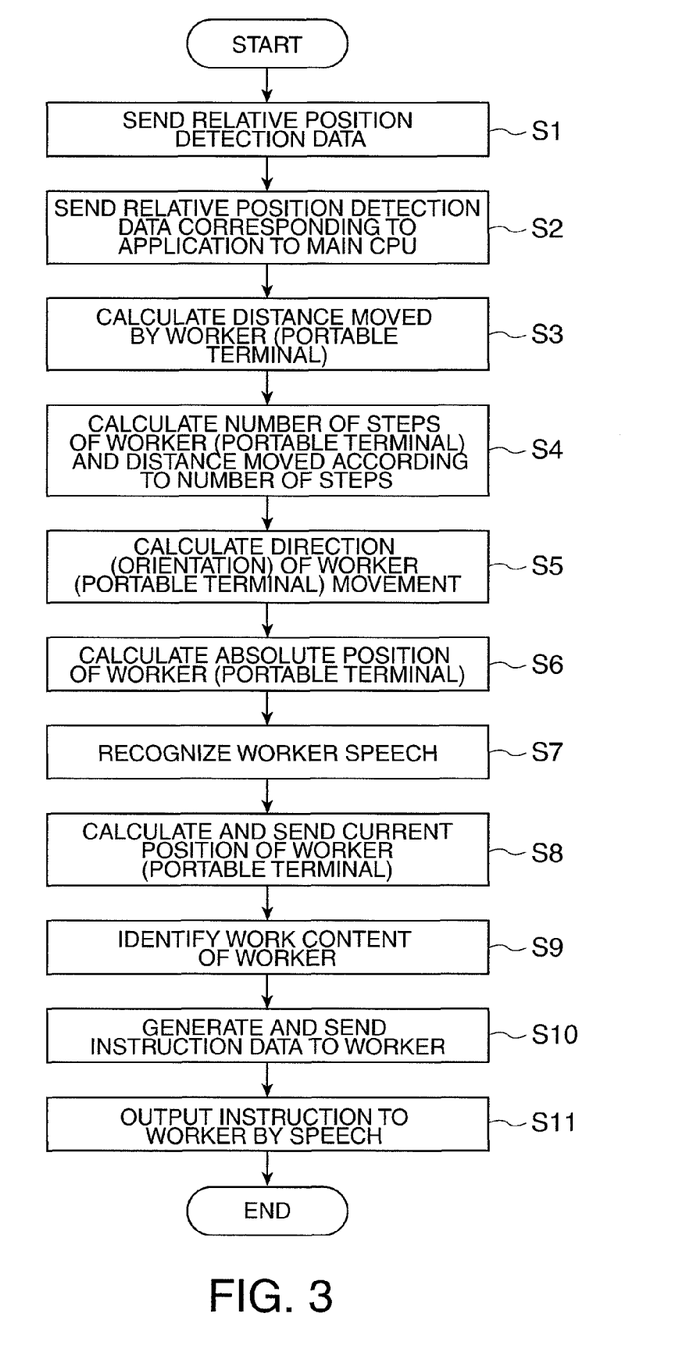
FIG. 3 is a flow chart describing an example of a data processing procedure based on position detection by the management server and portable terminal according to the present invention.

An example of the data processing procedure of the portable terminal and management system according to this embodiment of the invention based on position detection is described next with reference to the flow chart in FIG. 3.

The detection results of the 3-axis gyroscopic sensor 1-2a, 3-axis acceleration sensor 1-2b, barometric pressure sensor 1-2c, and geomagnetic sensor 1-2d that are the relative position detection sensors rendering the relative position detection unit 1-2 are sent to the position detection CPU 1-2e (step S1).

The position detection CPU 1-2e sends the sensor output selected from the detected output from all of the sensors with consideration for the characteristics of each sensor and the application to which the management server is applied to the main CPU 1-5 (step S2).

The main CPU 1-5 integrates the detected output from the 3-axis gyroscopic sensor and the detected output from the 3-axis acceleration sensor, and calculates the distance moved (step S3).

The main CPU 1-5 calculates the number of steps and the distance moved corresponding to the number of steps based on the detected output from the detected output of the 3-axis gyroscopic sensor and the detected output of the 3-axis acceleration sensor (step S4).

The main CPU 1-5 calculates the direction the worker moved (orientation) from the detected output of the 3-axis gyroscopic sensor (step S5).

The absolute position detection unit 1-1 sends the absolute position data of the portable terminal calculated by the CPU for short-range communication 1-1b based on plural reception signals received by the antenna 1-1a to the main CPU 1-5 (step S6).

The speech recognition and synthesis module 1-3 converts (recognizes) the speech acquired by the microphone 1-6b to digital data, and sends the recognition result to the main CPU 1-5 (step S7).

The main CPU 1-5 corrects the received absolute position data based on the number of steps, distance moved, terminal orientation, or other data calculated by the main CPU 1-5 to calculate the current position, including the orientation of the worker (portable terminal), on the floor. The speech recognition result data of the worker correlated to the corrected current position data of the worker is then sent through the wireless LAN 1-4 to the management server (step S8).

Note that in this embodiment of the invention the relative position data is primarily used in the main CPU 1-5 to correct the absolute position data. However, relative position data such as the distance moved, the number of steps, or the direction of movement calculated in steps S3 to S5, and the absolute position data calculated in step S6, can be sent as is with the speech recognition result data to the management server 2. This enables the management server 2 to also use that data for a particular application in the field in which the management system is applied.

Based on the speech recognition result data for the worker and the corrected current position data for the worker that is received through the wireless LAN, the management server 2 identifies the work content of the worker using the previously stored speech database related to worker tasks in each workplace (step S9).

Based on the identified work content, the management server 2 generates and sends instruction data for the worker to the portable terminal through the wireless LAN (step S10).

The portable terminal 1 converts the instruction data received through the wireless LAN to speech by means of the speech synthesis chip, and outputs the speech to the worker through the speaker (step S11).

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A portable terminal comprising:
 a microphone that acquires speech voiced by a user;
 a position detection unit that detects a position of the portable terminal using an absolute position detector and a relative position detector; and
 a speech recognition and synthesis unit that recognizes the speech using a database that is limited to work content terminology of work tasks used by workers at the position detected by the position detection unit.

2. The portable terminal described in claim 1, wherein:
 the detection result of the absolute position detector is corrected using the detection result from the relative position detector.

3. The portable terminal described in claim 1, wherein:
 the portable terminal can communicate with a server;
 the speech recognition and synthesis unit of the portable terminal includes a speech to digital data converter that compares the acquired speech with predetermined speech data in the database, and recognizes the acquired speech as digital data; and
 the absolute position data detected by the absolute position detector and the relative position data detected by the relative position detector are sent with the recognized digital data to the server.

4. The portable terminal described in claim 3, wherein:
 the database including the predetermined speech data can be changed based on the position detected by the position detection unit.

5. The portable terminal described in claim 1, further comprising:
 a digital data to speech converter that converts digital data received from the server to speech.

6. The portable terminal described in claim 1, wherein:
 the portable terminal receives signals transmitted from a short-range communication device; and
 the absolute position detector calculates the absolute position based on the signals.

7. The portable terminal described in claim 1, wherein:
 the relative position detector is at least one sensor selected from a group including a 3-axis gyroscopic sensor, a 3-axis acceleration sensor, a barometric pressure sensor, and a geomagnetic sensor.

8. A management system comprising:
 a portable terminal comprising:
  a microphone that acquires speech voiced by a worker;
  a position detection unit that detects a position of the portable terminal using an absolute position detector and a relative position detector;
  a speech recognition and synthesis unit that recognizes the speech using a database that is limited to work content terminology of work tasks used by workers at the position detected by the position detection unit; and a communication unit that sends position data from the position detection unit and speech recognition result data from the speech recognition and synthesis unit; and a server comprising:
   a server communication unit that receives the position data and the speech recognition result data; and
   an identifying unit that identifies a work task of the worker using the position data and the speech recognition result data.

9. The management system described in claim 8, the server further comprising:
   an instruction data generating unit that generates instruction data for the worker based on the identified work content from the identifying unit; and
   the server communication unit sends the instruction data to the portable terminal.

10. A management method comprising:
acquiring a speech voiced by a worker and detecting a position of a portable terminal;
recognizing the speech using a database that is limited to work content terminology of work tasks used by workers at the detected position;
sending position data and speech recognition result data to a server; and
identifying a work task of the worker using the position data and the speech recognition result data by the server.

\* \* \* \* \*